US010875460B2

(12) United States Patent
Magnuson et al.

(10) Patent No.: US 10,875,460 B2
(45) Date of Patent: Dec. 29, 2020

(54) DELIVERY VEHICLE RACK SYSTEM

(71) Applicant: Spartan Motors, Inc., Charlotte, MI (US)

(72) Inventors: Bret Magnuson, Granger, IN (US); Richard Eichstedt, Walkerton, IN (US); Douglas Sagarsee, Elkhart, IN (US); Glen Helmuth, Bourbon, IN (US); Samuel Colalillo, Jr., New Carlisle, IN (US)

(73) Assignee: Spartan Motors, Inc., Charolotte, MI (US)

( * ) Notice: Subject to any disclaimer, the term of this patent is extended or adjusted under 35 U.S.C. 154(b) by 212 days.

(21) Appl. No.: 16/201,259

(22) Filed: Nov. 27, 2018

(65) Prior Publication Data

US 2019/0168678 A1 Jun. 6, 2019

Related U.S. Application Data

(60) Provisional application No. 62/593,456, filed on Dec. 1, 2017.

(51) Int. Cl.
*B60R 7/08* (2006.01)
*B60P 3/00* (2006.01)

(52) U.S. Cl.
CPC ............... *B60R 7/08* (2013.01); *B60P 3/007* (2013.01)

(58) Field of Classification Search
CPC .................................. B60R 7/08; B60P 3/007
USPC ...................................................... 296/24.44
See application file for complete search history.

(56) References Cited

U.S. PATENT DOCUMENTS

| 7,159,915 B2 * | 1/2007 | Corey ...................... B60N 2/14 |
| | | 296/146.15 |
| 9,044,089 B1 | 6/2015 | Sandhu |
| 10,562,460 B2 * | 2/2020 | Forgette ................. B60R 9/045 |
| 2004/0149182 A1 | 8/2004 | Bienick et al. |

(Continued)

FOREIGN PATENT DOCUMENTS

WO     WO 2007/032686     3/2007

OTHER PUBLICATIONS

International Search Report; PCT/US2018/062987 Filing Date Nov. 29, 2018; dated Jun. 11, 2020.

(Continued)

*Primary Examiner* — Pinel E Romain
(74) *Attorney, Agent, or Firm* — Barnes & Thornburg LLP

(57) ABSTRACT

A vehicle is provided which has a rack assembly located in the vehicle. The rack includes a rail, a shelf movable along the rail between extended and retracted positions, and a track located adjacent the rail. The track includes a plurality of stop positions, each located at periodically spaced apart locations along the track. The shelf is selectively securable at a plurality of intermediate positions between the extended and retracted positions. The periodically spaced apart locations of the plurality of stop positions along the track are the intermediate positions that the shelf is selectively securable at. The shelf includes a stop member selectively engageable with the each stop position of the plurality of stop positions. When the stop member engages one stop position of the plurality of stop positions, the shelf is secured at one intermediate position of the plurality of intermediate positions between the extended and retracted positions.

19 Claims, 16 Drawing Sheets

(56) References Cited

U.S. PATENT DOCUMENTS

| | | | |
|---|---|---|---|
| 2005/0263337 A1 | 12/2005 | Corey et al. | |
| 2006/0016840 A1* | 1/2006 | Svenson | B60R 5/04 224/42.32 |
| 2007/0069542 A1* | 3/2007 | Steiger | B60P 3/14 296/24.44 |
| 2007/0247044 A1 | 10/2007 | Adams et al. | |
| 2008/0012375 A1* | 1/2008 | Steiger | B60P 3/14 296/37.6 |
| 2010/0096344 A1* | 4/2010 | Vanderhoek | A01G 9/143 211/49.1 |
| 2015/0183360 A1* | 7/2015 | Mowry | A47B 46/005 108/134 |
| 2017/0166103 A1 | 6/2017 | Eichstedt et al. | |

OTHER PUBLICATIONS

International Search Report; PCT/US2018/062987 Filing Date Nov. 29, 2018; dated Jun. 2, 2020.
International Search Report—Form 220; PCT Application No. US2018/062987; dated Mar. 22, 2019.
International Search Report—Form 210; PCT Application No. US2018/062987; dated Mar. 22, 2019.
International Search Report—Form 237—Written Opinion; PCT Application No. US2018/062987; dated Mar. 22, 2019.
International Search Report History; PCT Application No. US2018/062987; dated Mar. 7, 2019.

* cited by examiner

DELIVERY VEHICLE RACK SYSTEM

RELATED APPLICATIONS

The present Application is related to and claims priority to U.S. Provisional Patent Application, Ser. No. 62/593,456, filed on Dec. 1, 2017, entitled "Delivery Vehicle Rack System." The subject matter disclosed in that Provisional Application is hereby expressly incorporated into the present Application.

TECHNICAL FIELD AND SUMMARY

The present disclosure is related to a delivery vehicle, such as a mail delivery vehicle, and particularly related to selectively adjustable tray racks for use in such vehicles.

Delivery vehicles such as postal mail vehicles and the like, deliver both letters and parcels to just about every address in the United States. It is contemplated that other delivery carriers may do the same. As is common with the case of mail carriers, letters are inserted into mailboxes located at the curb of a road while packages are placed on a doorstep or in a building. As such, letters are often delivered to the mailbox from the mail carrier within the vehicle while parcels require the mail carrier to exit the vehicle and walk to the doorstep. And, of course, because parcels are becoming a larger percentage of the type of mail being delivered, there is a lot of exiting the vehicle during a normal mail delivery run.

As is common, the driving facilities for such postal mail vehicles are located on the right or curb side of the vehicle rather than the standard left side. In certain versions of newly designed delivery vehicles, there is open space next to the mail carrier in the passenger compartment area. This open space is a bulkhead passageway that leads to a cargo compartment located rearward of the passenger compartment. At the same time, this open space next to the driver's seat is available for letters and other materials prepared for delivery in curbside mailboxes. A problem arises using this space next to the mail carrier because the mail and other materials may get in the way of the bulkhead passageway needed to get to the cargo compartment.

Accordingly, an illustrative embodiment of the present disclosure provides a vehicle which comprises: a passenger compartment; a cargo compartment located adjacent the passenger compartment; a passageway located between the passenger and cargo compartments; wherein the passageway provides communication between the passenger and cargo compartments; a rack assembly located in the passenger compartment, the rack assembly comprising: a rail; at least one sliding shelf movable along the rail between extended and retracted positions; a track located adjacent the rail; wherein the track includes a plurality of notches; wherein each of the plurality of notches are positioned at periodically spaced apart locations on the track; wherein the at least one sliding shelf is selectively securable at a plurality of intermediate positions between the extended and retracted positions; wherein the periodically spaced apart locations of the plurality of notches along the track are the intermediate positions that the at least one sliding shelf is selectively securable between the extended and retracted positions; and a lever that is movably coupled to the at least one sliding shelf and movable with the at least one sliding shelf between the extended and retracted positions; wherein the lever includes a stop member that is sized to be received in the each notch of the plurality of notches; wherein, when the stop member is received in one notch of the plurality of notches, the at least one sliding shelf is secured at one of the plurality of intermediate positions between the extended and retracted positions; and wherein, when the lever is moved relative to the at least one sliding shelf, the stop member is removed from the one notch of the plurality of notches and the at least one sliding shelf is movable and selectively securable to another of the plurality of intermediate positions between the extended and retracted positions.

In the above and other illustrative embodiments, the vehicle may further comprise: the plurality of notches including an extended position notch and a retracted position notch; the lever being movably coupled to the at least one sliding shelf on a pivot pin so that movement of the lever removes the stop member from the one notch of the plurality of notches; the lever being biased toward the track by a bias member such that movement of the at least one sliding shelf to another notch of the plurality of notches causes the stop member to be received in another notch of the plurality of notches; the at least one sliding shelf including a tray; the at least one sliding shelf being a plurality of sliding shelves, wherein each shelf of the plurality of sliding shelves is selectively securable at a plurality of intermediate positions between the extended and retracted positions; the at least one sliding shelf being vertically adjustable; the at least one sliding shelf being vertically adjustable without having to remove any contents from the at least one sliding shelf; the at least one sliding shelf including a vertical height adjustment that includes at least one set fastener and at least one pin which are each engageable with the track, wherein the track is located on a wall of the rack assembly, wherein the track includes a plurality of spaced apart openings sized to receive the at least one pin, wherein the plurality of spaced apart openings are located at discrete vertically-oriented positions with respect to each other along the track, wherein the at least one pin is selectively engageable with each opening of the plurality of spaced apart openings, wherein the track includes a vertically-oriented slot sized to receive the set fastener to selectively position the track at a plurality of locations on the wall; and when the pin is selectively disengaged from the opening of the plurality of spaced apart openings and the set fastener is loosened from the vertically-oriented slot, the track of the at least one sliding shelf is movable to another discrete vertical position with respect to the wall, wherein, when the track is located at the another discrete vertical position, the set fastener is tightened to the vertically-oriented slot and the pin is moved to engage another opening of the plurality of spaced apart openings to secure the track to the another discrete vertical position.

Another illustrative embodiment of the present disclosure provides a vehicle which comprises: a rack assembly located in the vehicle, the rack assembly comprising: a rail; at least one shelf movable along the rail between extended and retracted positions; a track located adjacent the rail; wherein the track includes a plurality of stop positions; wherein each of the plurality of stop positions are positioned at periodically spaced apart locations along the track; wherein the at least one shelf is selectively securable at a plurality of intermediate positions between the extended and retracted positions; wherein the periodically spaced apart locations of the plurality of stop positions along the track are the intermediate positions that the at least one shelf is selectively securable at; wherein the at least one shelf includes a stop member selectively engageable with the each stop position of the plurality of stop positions; and wherein, when the stop member engages one stop position of the plurality of stop positions, the at least one shelf is secured at one intermediate position of the plurality of intermediate positions between the extended and retracted positions.

In the above and other illustrative embodiments, the vehicle may further comprise: when the stop member of at least one shelf is removed from the stop position, the at least one shelf is movable and selectively securable to another of the plurality of intermediate positions between the extended and retracted positions; further comprising a passenger compartment, a cargo compartment located adjacent the passenger compartment, and a passageway located between the passenger and cargo compartments, wherein the passageway provides communication between the passenger and cargo compartments, and wherein the rack assembly is located in the passenger compartment; the plurality of stop positions being structures selected from the group consisting of at least one magnetic stop, clamp stop, spring plunger stop, and notch; the stop member being a structure selected from the group consisting of at least one magnetic stop, clamp stop, spring plunger stop, tab, and block; a lever that is movably coupled to the at least one shelf and movable with the at least one shelf between the extended and retracted positions; and, when the lever is moved relative to the at least one shelf, the stop member is removed from the stop position of the plurality of stop positions and the at least one shelf is movable and selectively securable to another of the plurality of stop positions.

Another illustrative embodiment of the present disclosure provides a vehicle which comprises: a rack assembly located in the vehicle, the rack assembly comprising: a rail; at least one shelf movable along the rail between extended and retracted positions; a track located adjacent the rail; wherein the track includes a plurality of stop positions; wherein each of the plurality of stop positions are positioned at periodically spaced apart locations along the track; wherein the at least one shelf is selectively securable at a plurality of intermediate positions between the extended and retracted positions; wherein the at least one sliding shelf includes a vertical height adjustment that includes at least one set fastener and at least one pin, each engageable with the track; wherein the track is located on a wall of the rack assembly; wherein the track includes a plurality of spaced apart openings sized to receive the at least one pin; wherein the plurality of spaced apart openings are located at discrete vertical positions with respect to each other along the track; wherein the at least one pin is selectively engageable with each opening of the plurality of spaced apart openings; and wherein the track includes a vertically-oriented slot sized to receive the set fastener to selectively position the track at a plurality of locations on the wall.

In the above and other illustrative embodiments, the vehicle may further comprise: when the pin is selectively disengaged from the opening of the plurality of spaced apart openings and the set fastener is loosened from the vertically-oriented slot, the at least one sliding shelf is movable to another discrete vertical position with respect to the wall, wherein, when the track is located at the another discrete vertical position, the set fastener is tightened to the vertically-oriented slot, and the track pin is moved to engage another opening of the plurality of spaced apart openings to secure the track to the another discrete vertical position; and the periodically spaced apart locations of the plurality of stop positions along the track are the intermediate positions that the at least one shelf is selectively securable at, and wherein the at least one shelf includes a stop member selectively engageable with the each stop position of the plurality of stop positions, wherein, when the stop member engages one stop position of the plurality of stop positions, the at least one shelf is secured at one intermediate position of the plurality of intermediate positions between the extended and retracted positions.

Additional features and advantages of vehicle rack assembly will become apparent to those skilled in the art upon consideration of the following detailed descriptions exemplifying the best mode of carrying out the vehicle rack assembly as presently perceived.

BRIEF DESCRIPTION OF DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Corresponding reference characters indicate corresponding parts throughout the several views. The exemplification set out herein illustrates embodiments of vehicle rack assembly, and such exemplification is not to be construed as limiting the scope of the vehicle rack assembly in any manner.

DETAILED DESCRIPTION OF THE DRAWINGS

Figure 1:
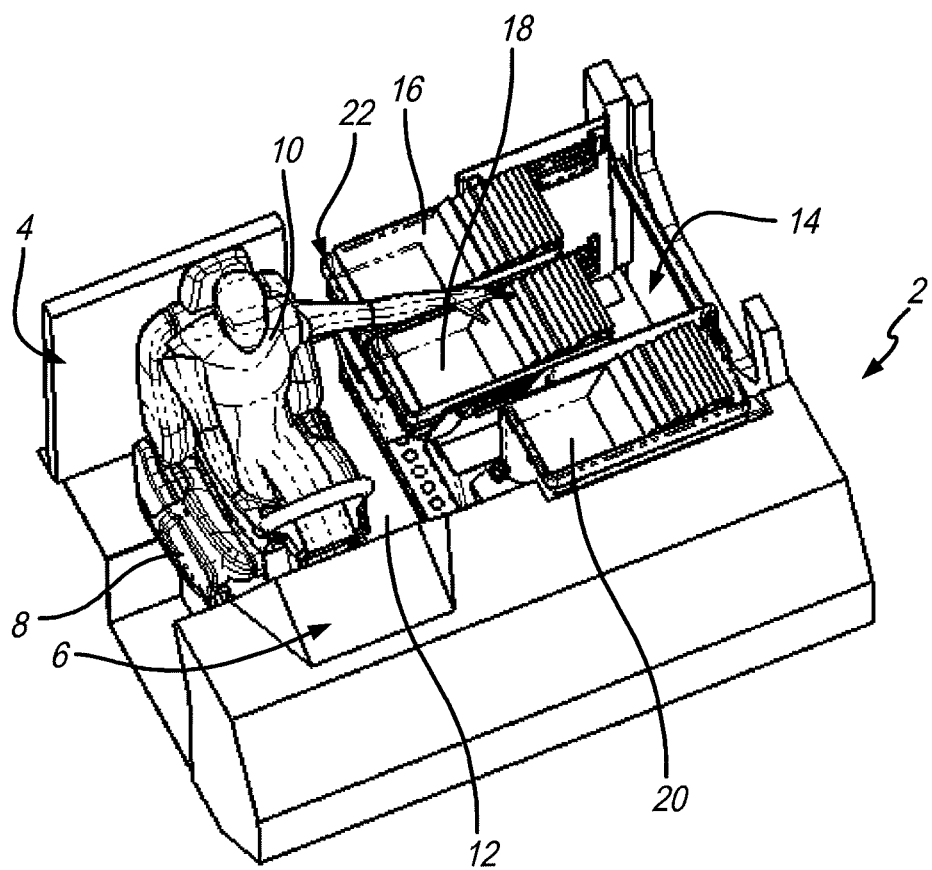
FIG. 1 is a perspective view of a portion of an interior of a passenger compartment of a delivery vehicle.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the present disclosure includes a delivery vehicle rack assembly having selectively adjustable trays movable in both horizontal and vertical directions to allow both access to mail and other materials next to the mail carrier while at the same time being movable to allow the mail carrier access to the bulkhead passageway to the cargo compartment.

In an illustrative embodiment, the rack assembly includes at least one sliding shelf or tray. The shelf or tray is capable of sliding between fully extended outward and retracted inward positions. Between the fully extended and retracted positions, however, the shelf or tray may be selectively set to a plurality of intermediate positions. The shelf or tray is also selectively securable in any one of those positions. Illustratively, movement of a bar, lever, or other like structure may easily and conveniently release the shelf or tray from one of the plurality of intermediate locations so it can move to another intermediate location or the full extended or retracted position. When the shelf or tray is positioned in one of these positions, it is secured there unless the lever or other like structure is engaged to allow the shelf or tray to move again. The result is a convenient way of moving the shelf or tray to make it useful to the mail carrier sitting in the driver's seat use the shelf or tray and also easily move it out of the way when the mail carrier has to get out of the driver's seat. In this way, the shelf or tray does not serve as an impediment to the mail carrier's movements, or otherwise block the bulkhead passageway to the cargo compartment.

In an illustrative embodiment, at least one tray of the rack assembly may be slidable about along a rail between the fully extended and retracted positions. Adjacent the rail is a track that includes a plurality of notches periodically spaced there along. The tray may include a lift lever that is actuable by a lift bar configured to move a positioning stop into and out of the notches on the track. In illustrative practice, the mail carrier may engage the lift bar which moves the lift lever, thereby removing the positioning stop from one of the notches in the track. When this happens, the tray is free to move along the rail until it reaches either the fully extended or retracted position. The positioning stop may alternatively engage another one of the notches along the path of travel of the tray. In a further illustrative embodiment, the lift lever may be configured to automatically engage one of the notches when the positioning stop moves to the vicinity of same. For example, a spring may be employed to engage the lift lever such that when the mail carrier engages the lift bar, movement of the lift bar is against the bias of the spring. The bias of the spring may urge the positioning stop into a notch whenever the positioning stop is moved to the vicinity of the notch. By the mail carrier engaging the lift bar against the bias of the spring, the lift lever moves the positioning stop out of the notch. The mail carrier is then free to move the tray along its path of travel. If the lift bar is not continuously engaged while the tray is moving, when the positioning stop reaches another one of the notches, the spring bias will act on the lift lever to push the positioning stop into that notch. It is appreciated that in other embodiments, the engagement mechanism between the tray and the rack assembly may be such that the stop mechanism does not automatically engage a corresponding notch or like structure. In further illustrative embodiments, the tray may be selectively stopped along its path of travel between fully extended and retracted positions by means of a magnetic stop, clamp stop, or spring plunger stop, for example.

A perspective view of a portion of the interior of passenger compartment 4, of delivery vehicle 2, is shown in FIG. 1. It is appreciated that delivery vehicle 2 is illustratively a mail delivery or like vehicle that includes operator facilities 6 on the right-hand or curb side of the vehicle. This is the opposite side on which operator facilities are located on in the United States. Typically, operator facilities such as the steering wheel, accelerator, brake pedal, transmission, operation, as well as indicator dials, are located on the left-hand side of the vehicle in the United States. Because, however, a mail delivery vehicle, such as delivery vehicle 2, is configured to deliver mail in curb-side mailboxes, operator facilities 6 are located on the right-hand side. As such, seat 8 and vehicle operator 10 are located on the right-hand side as well. Other embodiments of the disclosure, however, may operate as intended when operator facilities 6 and seat 8 are located on the left-hand side of the vehicle.

Figure 4:
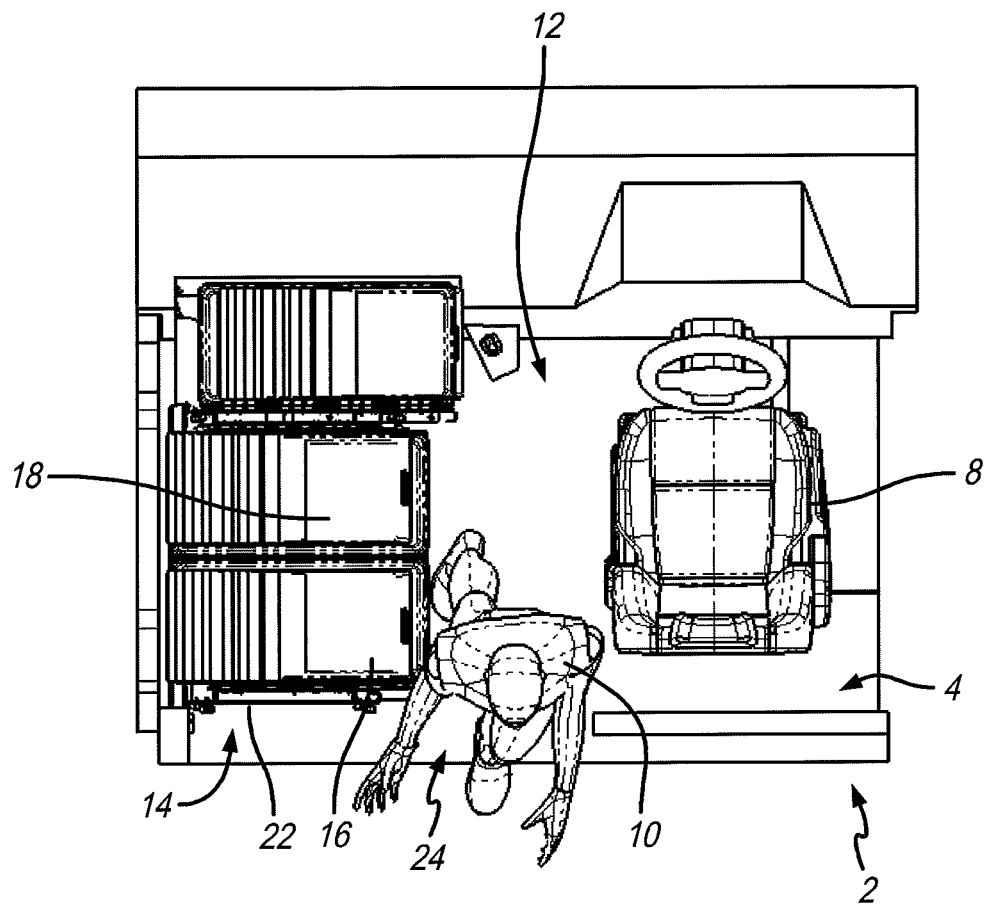
FIG. 4 is another top view of the passenger compartment of the delivery vehicle.

Also, located adjacent seat 8 is pathway 12, which leads to bulkhead passageway 24 (see, also, FIG. 4). This is the primary means for vehicle operator 10 to move from passenger compartment 4 to the cargo compartment (not shown) located behind passenger compartment 4 to access parcels or other materials therein. Adjacent pathway 12, opposite seat 8, is space 14. Trays 16, 18, and 20 are located in space 14 adjacent pathway 12. For at least trays 16 and 18, they are part of tray rack assembly 22. As further described herein, however, it is appreciated that trays 16 and 18 are extended over at least a portion of pathway 12 adjacent seat 8. In this configuration, vehicle operator 10—typically a mail carrier—is in proximity of the trays and able to access any letters or other materials supported thereon. This makes it convenient to take mail from trays 16 and 18 and deliver them to curbside mailboxes while vehicle operator 10 is still sitting in the seat 8.

Figure 2:
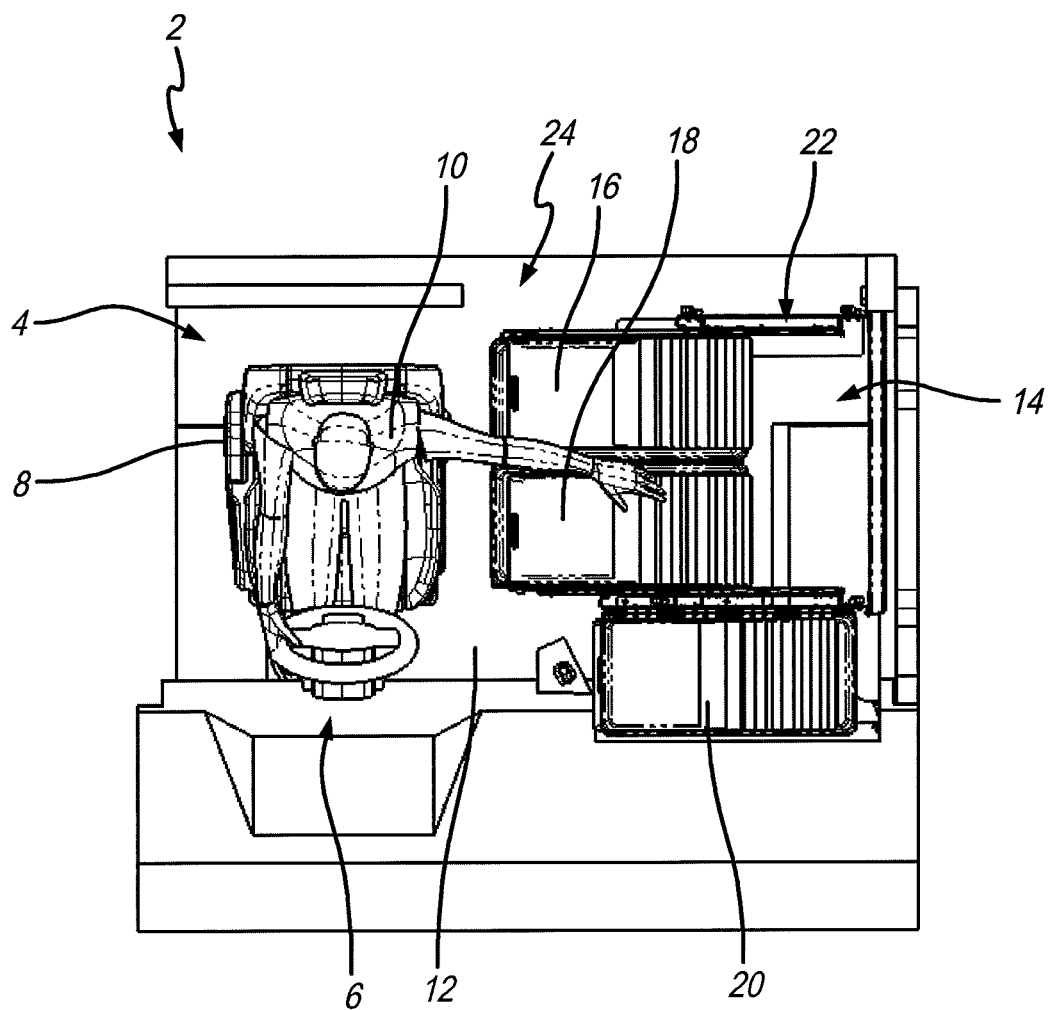
FIG. 2 is a top view of a portion of the delivery vehicle.

A top view of a portion of delivery vehicle 2 is shown in FIG. 2. Here, the arrangement of seat 8, operator facilities 6, pathway 12, and trays 16 and 18 are arranged in passenger compartment 4. This view further demonstrates the arrangement of tray rack assembly 22 that supports trays 16 and 18 in space 14 adjacent pathway 12. Also depicted is how trays 16 and 18 extend with respect to tray rack assembly 22. This makes it convenient for vehicle operator 10 to access trays 16 and 18. At the same time, however, this view demonstrates how trays 16 and 18 extend over pathway 12. In this position, trays 16 and 18 make it difficult for vehicle operator 10 to use pathway 12 in order to access bulkhead passageway 24, and thus, the cargo compartment (not shown).

Figure 3:
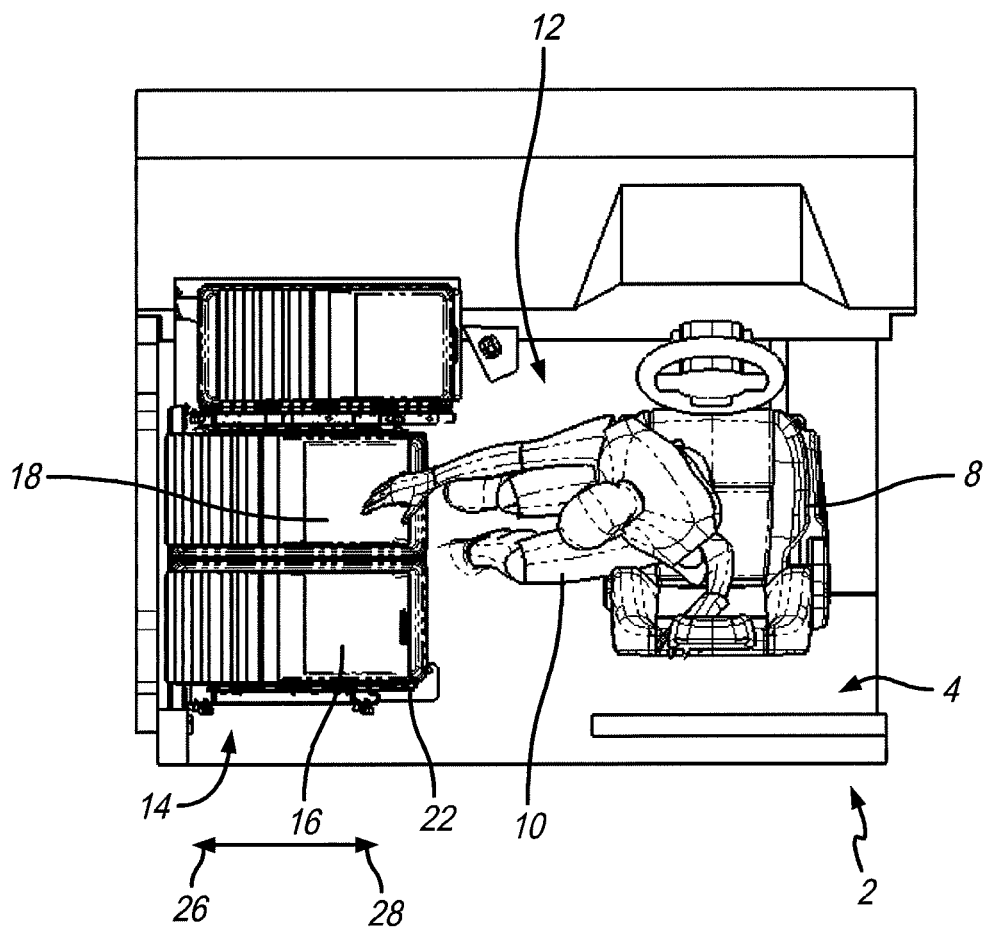
FIG. 3 is another top view of the passenger compartment of the delivery vehicle.

In order to access pathway 12, trays 16 and 18 of tray rack assembly 22 needs to be moved out of the way. A top view of passenger compartment 4 of delivery vehicle 2 is shown in FIG. 3. In this view, trays 16 and 18 have been moved in direction 26 to a retracted position with respect to tray rack assembly 22 in order to clear pathway 12. This allows vehicle operator 10 to access pathway 12 as shown in this view. Particularly, trays 16 and 18 are moved further into space 14 clearing the way for vehicle operator 10 to exit seat 8 and enter pathway 12.

Another top view of passenger compartment 4 of delivery vehicle 2 is shown in FIG. 4. Here, vehicle operator 10 is free to move along pathway 12 and through bulkhead passageway 24 to enter the cargo compartment (not shown) rearward of passenger compartment 4. What the views in FIGS. 1 through 4 demonstrate is the need to have both the availability of trays 16 and 18 extended from tray rack assembly 22 in space 14 located adjacent seat 8 (see FIG. 1), and have trays 16 and 18 retracted in tray rack assembly 22 away from seat 8 and pathway 12. This is to allow vehicle operator 10 to move within the passenger compartment 4 and exit same into the rearward cargo compartment (not shown).

Certainly, sliding shelves and trays are known. An issue here, however, is that because much of the time, the trays need to be extended so vehicle operator 10 may deliver mail, the trays (such as trays 16 and 18) need to be selectively securable to their extended positions. Furthermore, it may be useful to vehicle operator 10 for trays 16 and 18 to be selectively securable at particular locations along the path of travel of same between their extended and retracted positions. Still further, being in a moving vehicle, securing the trays will be useful, since otherwise, the trays may inadvertently slide between extended and retracted positions while delivery vehicle 2 travels over varied terrain.

Figure 5:
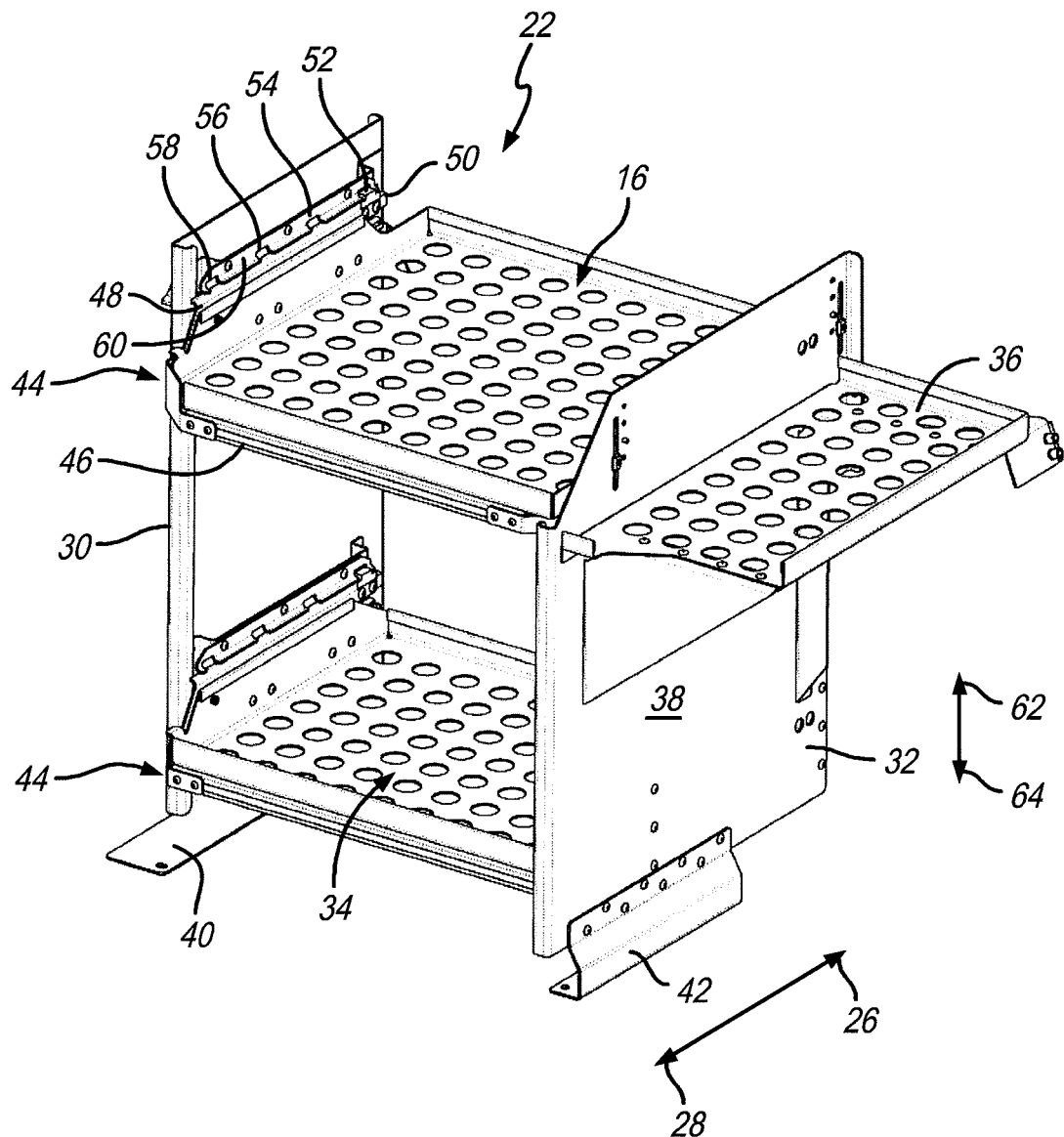
FIG. 5 is a right-hand perspective view of a tray rack assembly with a tray located thereon in its retracted position.

Accordingly, illustrative embodiment of the present disclosure includes tray rack assembly 22 with tray 16 that moves between extended and retracted positions and can be selectively held at those and intermediate positions in delivery vehicle 2. A right-hand perspective view of tray rack assembly 22, with tray 16 located thereon, in a retracted position, is shown in FIG. 5. This view further shows sidewalls 30 and 32 upwardly extending and spaced apart from each other with tray 16 located therebetween. In this illustrative embodiment, a second tray 34 is located underneath tray 16. It will be appreciated by the skilled artisan upon reading this disclosure that any number of trays that include the mechanisms described herein may be deployed on tray rack assembly 22. The configuration and design of these two trays 16 and 34, shown herein, are for illustrative purposes. Also, this embodiment shows a side-board tray 36 attached to outer wall 38 of sidewall 32. Attachment brackets 40 and 42 are attached to sidewalls 30 and 32, respectively, and are configured to fasten to the floorboard of space 14 in passenger compartment 4 (see, also FIGS. 1 through 4). This will prevent tray rack assembly 22 from moving in space 14 while delivery vehicle 2 is moving.

Both trays 16 and 34 further include a selective adjustment assembly 44 which will allow vehicle operator 10 to selectively move either tray 16 or 34 to extended, retracted, and intermediate locations in-between. The trays are held in place until operator 10 affirmatively moves them to another location. As shown herein, selective adjustment assembly 44 includes an illustrative lift bar 46 that connects to a lift lever 48, having a positioning stop 50 attached thereto, configured to engage notches 52, 54, 56, and 58 on track 60. It is appreciated that the spacing of notches 52, 54, 56, and 58 represent locations along the path of travel in directions 26 and 28 that tray 16 may stop at and be secured to. It is further appreciated that any number of notches may be formed along track 60 to define the several stop locations tray 16 may have available between fully extended and retracted positions. In operation, lift bar 46 may be activated to move lift lever 48, which moves positioning stop 50 out of notch 52. It is the engagement between positioning stop 50 and notch 52 that prevents tray 16 from moving in either direction 26 or 28. As such, unless positioning stop 50 is removed from notch 52 (or other notch), tray 16 will remain secured in that location. When positioning stop 50 is removed from notch 52, tray 16 will be free to move in directions 26 and 28 until positioning stop 50 engages in another notch along track 60.

Because delivery vehicle 2 is intended to carry letters and parcels of a variety of sizes, it may be useful for tray 16 to be vertically adjustable in directions 62 and 64 so the tray height will accommodate the different materials that may sit on tray 16. Additionally, as shown in FIGS. 1 and 2, operator 10 may need to continually reach over and grasp materials on tray 16. Having a height adjustment for same may be ergonomically beneficial to vehicle operator 10. To that end, also shown in FIG. 5 are portions of a tray height adjustment assembly 100 further discussed herein with respect to FIGS. 15 through 19A and 19B.

Figure 6:
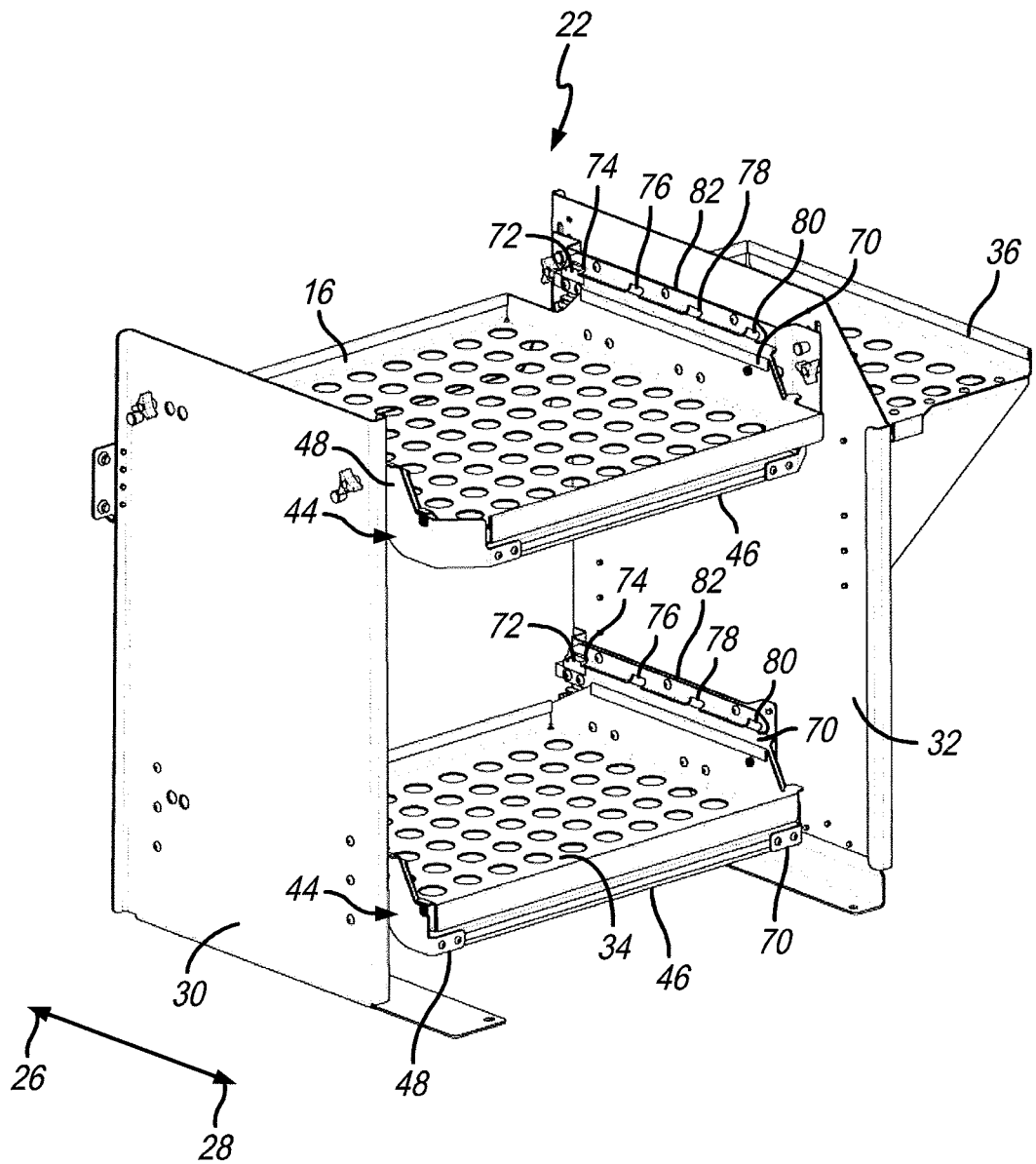
FIG. 6 is a left-hand perspective view of the tray rack assembly.

A left-hand perspective view of tray rack assembly 22 is shown in FIG. 6. These views show similar structures to that identified in FIG. 5. In this view, however, it is appreciated how lift bar 46 also attaches to another lift lever 70, adjacent sidewall 32. Also part of selective adjustment assembly 44 is lift lever 70, attached to positioning stop 72, illustratively disposed in notch 74 of track 82. Similar to track 60, track 82 also includes corresponding notches 76, 78, and 80. It is further appreciated that the structures shown in this view work the same as the corresponding structures previously described, located adjacent sidewall 30. Because both lift levers 48 and 70 are connected to lift bar 46, engagement of only lift bar 46 will cause both positioning stops 50 and 72 to exit from notches 52 and 74, respectively, to allow tray 16 to be moved in either direction 26 or 28. In other words, engaging lift bar 46 simultaneously disengages positioning stops 50 and 72 from notches 52 and 74, respectively, to conveniently allow tray 16 to move in either direction 26 or 28. It is also appreciated from this view that second tray 34 may also include selective adjustment assembly 44, with the same lift lever 70 positioning stop 72 and notches 74, 76, 78, and 80 in track 82 as well. This means, second tray 34 may be selectively moved and held at a myriad of intermediate positions between extended and retracted positions in directions 26 and 28, just like tray 16. It is further appreciated that any additional number of trays may be added to tray rack assembly 22, and include thereon selective adjustment assembly 44, in order to accomplish the same selective movement and securement.

Figure 7:
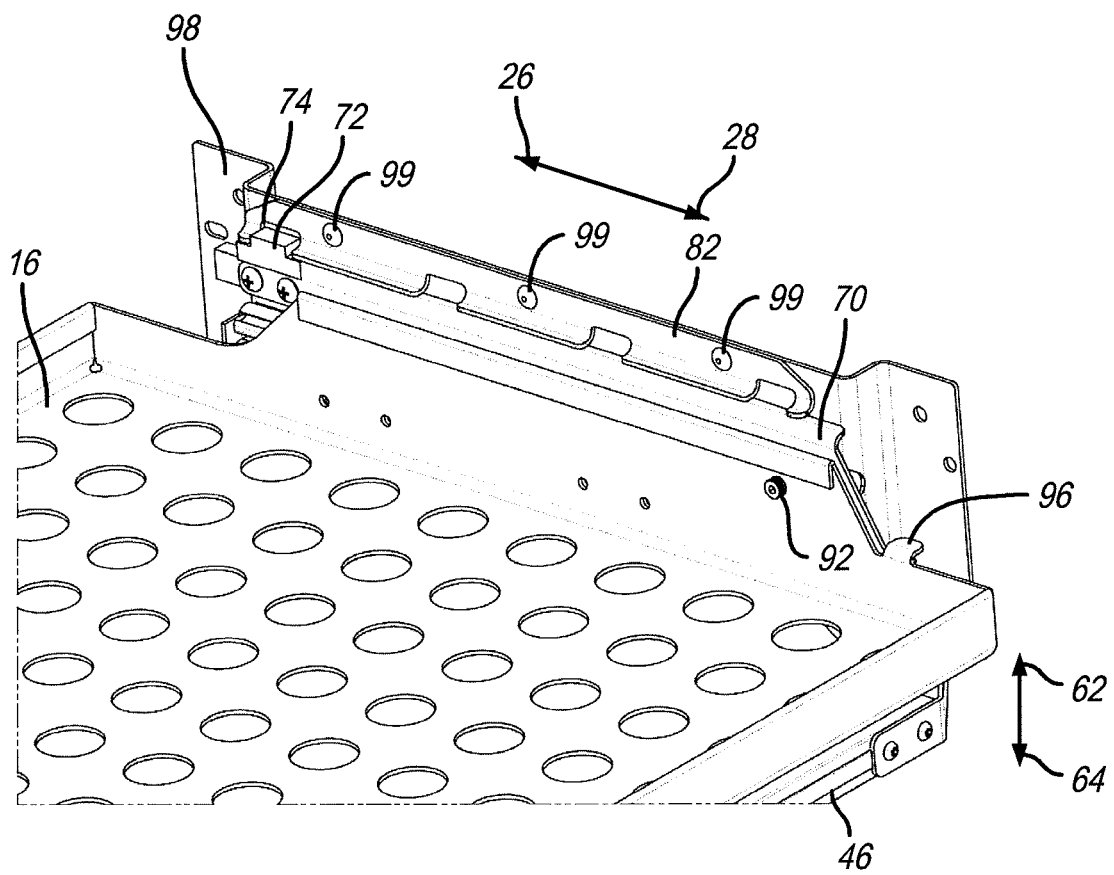
FIG. 7 is a perspective detail view of a portion of a tray with a lift lever and track.

A perspective detail view of a portion of tray 16, along with lift lever 70 and track 82, is shown in FIG. 7. It is appreciated that the described operation of lever 70, with respect to track 82, will be the same as track 60, and lift lever 48 located on the opposite side of tray 16 (see FIG. 5). This view shows tray 16 with positioning stop 72 fitted within notch 74 of track 82. Here, tray 16 is in a recessed position with respect to tray rack assembly 22. This view also shows lift bar 46, which attaches to both lift levers 48 and 70. This means when lift bar 46 is moved in direction 62, both lift levers 48 and 70 are caused to move in concert. It is also appreciated that by moving lift bar 46, positioning stop 72 will exit notch 74 (as well as positioning stop 50 exit notch 52) allowing tray 16 to slide in direction 28, thereby extending tray 16 from tray rack assembly 22. This view further shows pivot pin 92, which, as described further with respect to FIGS. 8 and 9, allows lift lever 70 to pivot with respect to tray 16. Still further shown in this view is tab 96, which is also further described with respect to FIGS. 8 and 9. Tab 96 provides a stop surface that engages spring 94 to bias lift lever 70 to keep bias in direction 64. In this illustrative embodiment, track 82 may be attached to bracket 98 which attaches to sidewall 32 via fasteners 99. In other embodiments, however, other means for attaching track 82 to sidewall 32 may be alternatively deployed.

Figure 8:
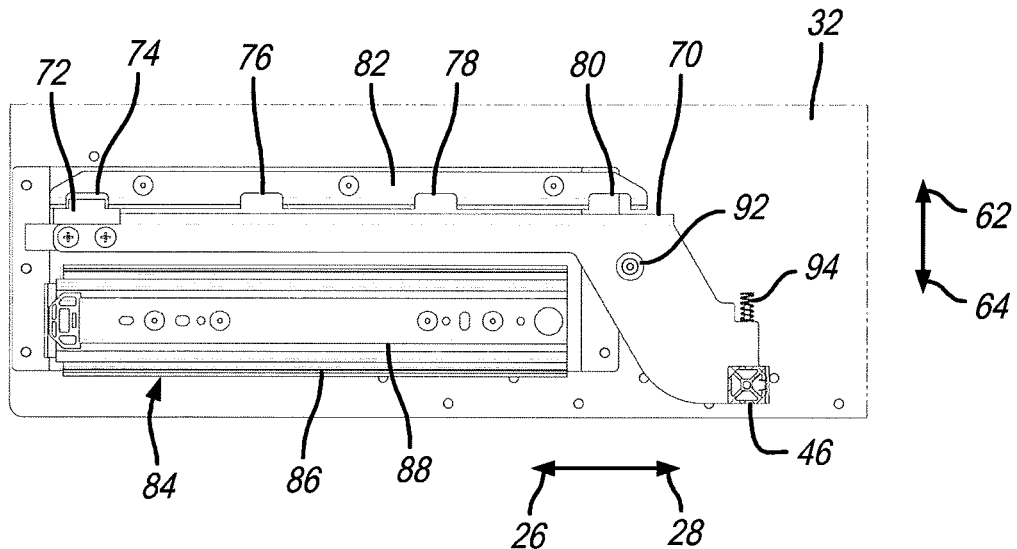
FIG. 8 is a side view of the lift lever pivotally movable with respect to a sidewall.
Figure 9:
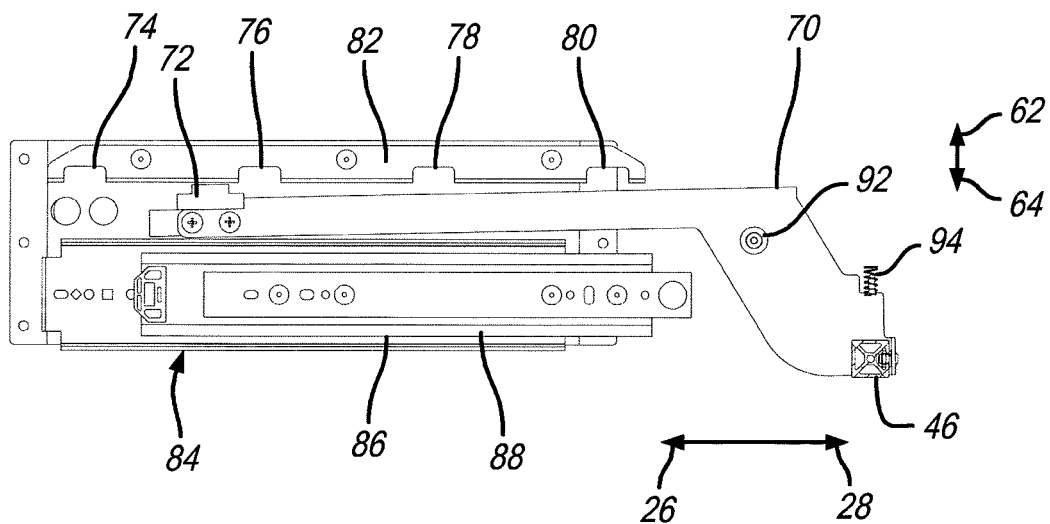
FIG. 9 is another side view of the lift lever pivotally movable with respect to the sidewall.

Side progression views of lift lever 70, pivotally movable with respect to sidewall 32, is shown in FIGS. 8 and 9. These views show track 82 which include notches 74, 76, 78, and 80 periodically placed there on. A tray slide assembly 84 is shown illustratively including a rail bracket 86 and a slide 88 configured to move longitudinally along rail bracket 86, in directions 26 and 28. Illustratively, tray 16 attaches to slide 88 to move in directions 26 and 28 with respect to tray rack assembly 22. It is further appreciated that another tray slide assembly 90 may be attached to sidewall 30, opposite tray slide assembly 84, to further support tray 16 moving same in directions 26 and 28 (see, e.g., FIG. 10). A skilled artisan upon reading this disclosure will appreciate that any number of sliding-type rail mechanisms may work, including but not limited to, a roller and track or bearing surfaces. With tray 16 removed for demonstrative purposes, lift lever 70 is shown with positioning stop 72 illustratively fitted into notch 74. A pivot pin 92 (see FIG. 7) makes lift lever 70 pivotable with respect to tray 16. This allows lift lever 70 to be pivoted independent of tray 16. Lift bar 46 is shown attached to lift lever 70. This means lift bar 46 is attached to both lift levers 48 and 70, which cause respective positioning stops 50 and 72 to move into and out of the notches on tracks 60 and 82, respectively. Additionally, a spring 94 is attached to lift lever 70 to create a bias force in direction 64 (i.e., keeping positioning stop 72 in one of the illustrative notch 74, 76, 78, or 80) when no force is acting on lift bar 46. This is accomplished by spring 94 also engaging tab 96, extending from tray 16 (see FIG. 7).

Because pivot pin 92 acts as a fulcrum between lift bar 46 and positioning stop 72, bias of spring 94, in direction 64, adjacent lift bar 46, will cause positioning stop 72 located distal of lift bar 46, and on the other side of pivot pin 92, to be biased in direction 62. This means positioning stop 72 (and the same with positioning stop 50 on lift lever 48) will be biased in direction 62 and into notch 74 (or alternatively, any of the other notches) in track 82. Accordingly, in order to move positioning stop 72 out of a notch, an operator will need to move lift bar 46 in direction 62 against, and overcoming, the bias and spring 94 to pivot lift lever 70 which moves positioning stop 72 in direction 64 in and out of, in this case, notch 74, as shown in FIG. 9. This is a side view of lift lever 70 similar to that shown in FIG. 8, except that lift bar 46 has been moved in direction 62 against the bias of spring 94 (which will compress) to cause lift lever 70 to pivot on pivot pin 92, thereby moving positioning stop 72 distal from lift bar 46 to move in direction 64 and out of notch 74 of track 82. Additionally, this view shows lift lever 70 pivotally coupled to tray 16 moved outward in direction 28 which is extending outward from tray rack assembly 22 (see FIG. 1). Hence, by lifting lift bar 46 in direction 62, as well as pulling lift bar 46 in direction 28, as shown here in FIG. 9, tray 16 is free to move and extend in direction 28 until positioning stop 72 (or 50 for that matter) engages a different notch. Releasing lift bar 46 causes bias from spring 94 to move lift lever 70 downward in direction 64 to move positioning stop 72 upward in direction 62 and into another notch. Also shown in this view is tray slide assembly 84 with slide 88 moved in direction 28 from rail bracket 86. This is expected as slide 88 will be attached to tray 16 which will move relative to rail bracket 86, which will be attached to bracket 98 (see, also, FIG. 7) Again, it is appreciated that the corresponding structures attached to sidewall 30 will operate in the same manner as described herein, with respect to FIGS. 7, 8, and 9.

Figure 10:
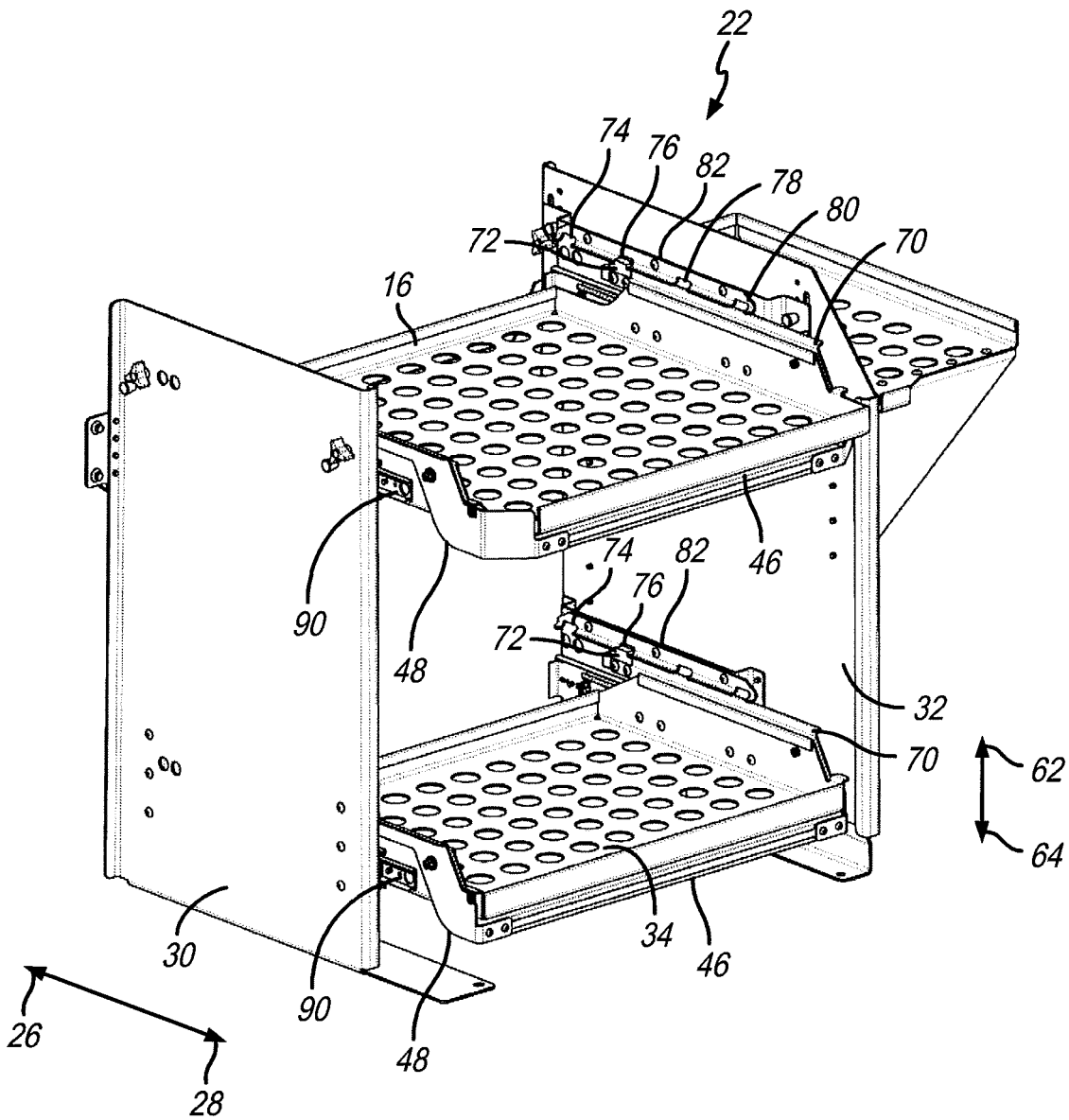
FIG. 10 is a perspective view of the tray rack assembly.
Figure 11:
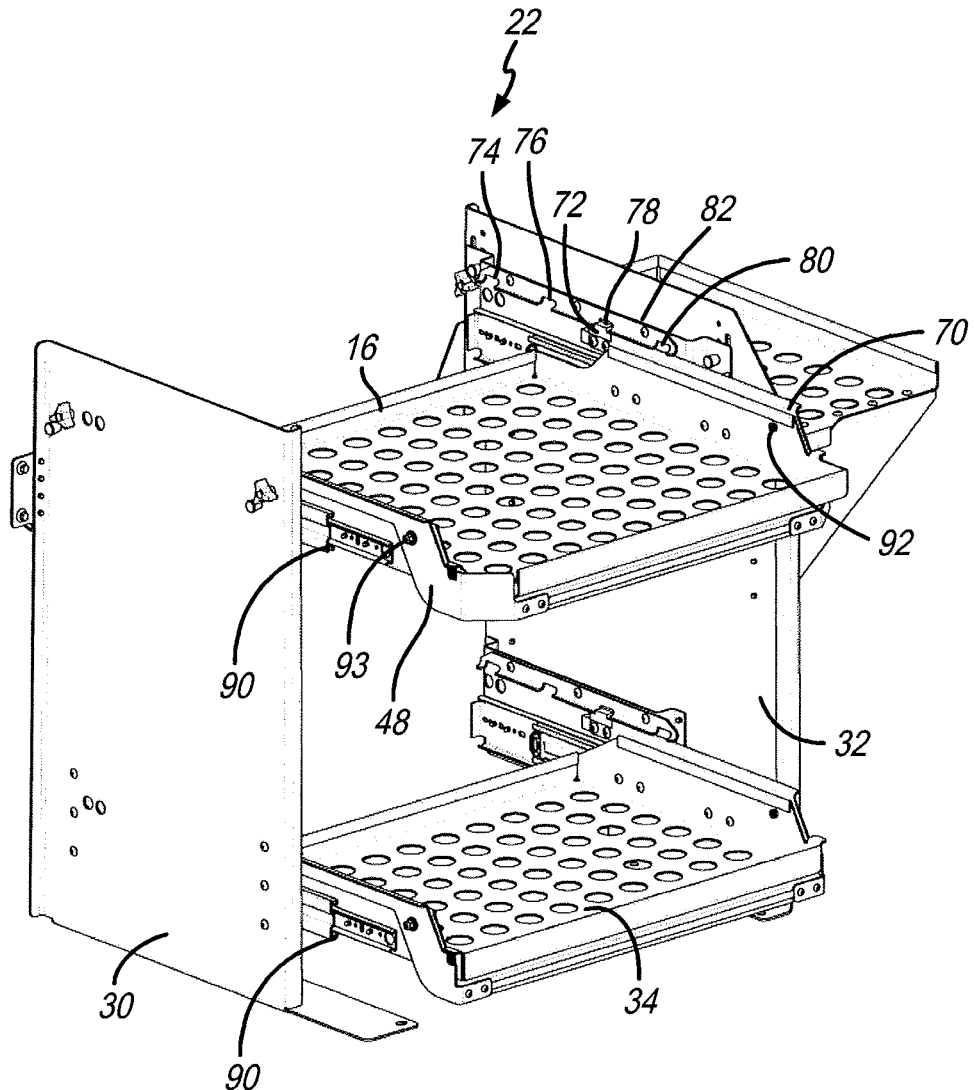
FIG. 11 is another perspective view of the tray rack assembly.
Figure 12:
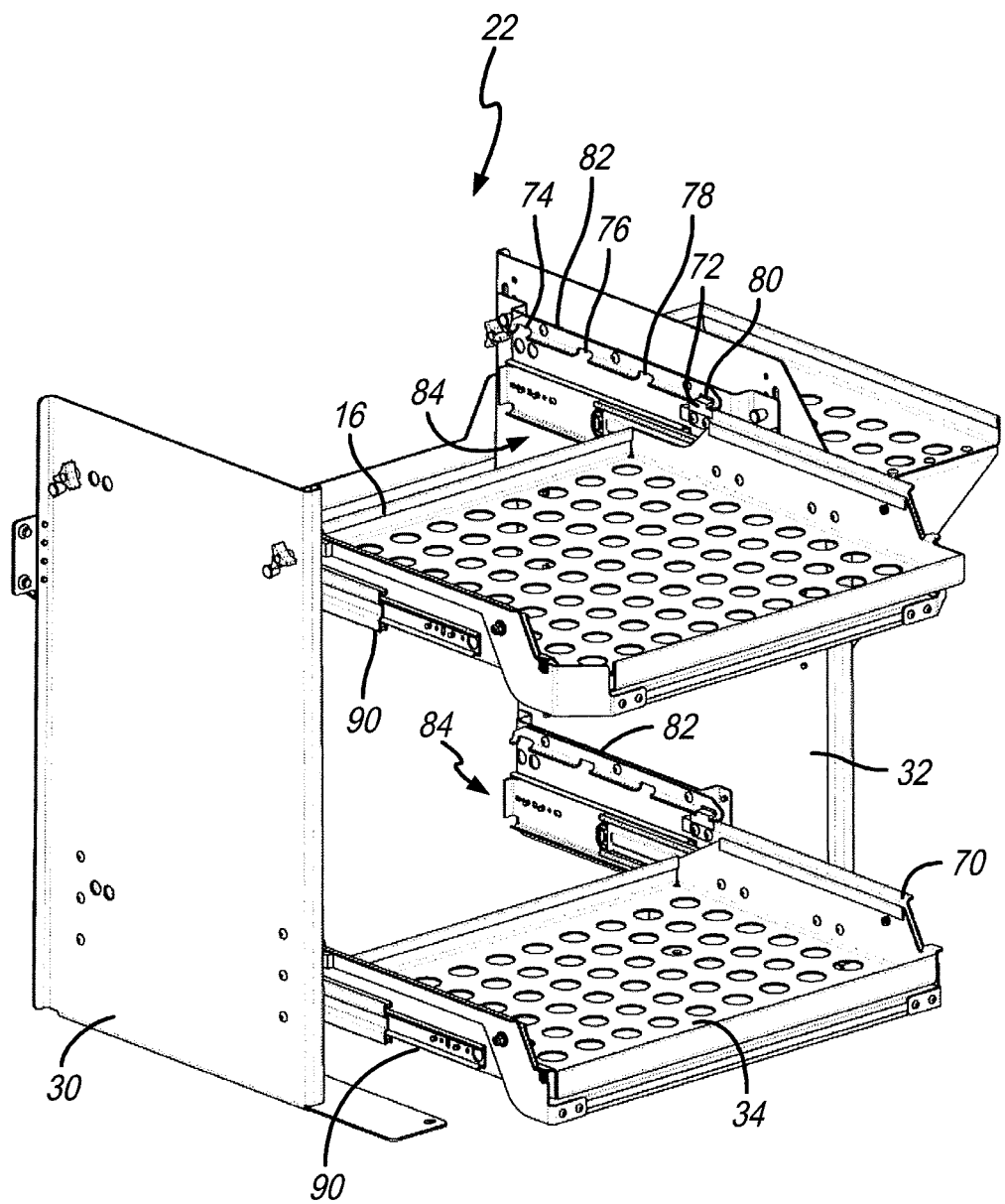
FIG. 12 is another perspective view of the tray rack assembly.

Perspective views, similar to that shown in FIG. 6 of tray rack assembly 22, are shown in FIGS. 10, 11, and 12. These views are progression views demonstrating how both trays 16 and 34 may extend in direction 28 and be held in place. For example, as shown in FIG. 10, tray 16 is extended in direction 28 such that positioning stop 72 is located in notch 76 of track 82. This means that trays 16 and 34 are both held securely in this extended position and will not move from same until lift levers 48 and 70 are moved by lifting on lift bar 46 in direction 62. This view also shows a portion of tray slide assembly 90 on each of tray 16 and 34 that attach to sidewall 32 to permit sliding movement in directions 26 and 28.

The corresponding view in FIG. 11 is similar to that shown in FIG. 10 except that trays 16 and 34 have been extended further in direction 28. Here, positioning stop 72 (as well as positioning stop 50 not shown) is now fitted in notch 80 of track 82 (and positioning stop 50 is fitted in notch 56, not shown in this view). It is further appreciated from this view how trays 16 and 34 may be further extended in direction 28 and positively held in a selectively fixed position so it cannot move without engaging lift bars 46 as previously discussed.

Lastly, the perspective view of tray rack assembly 22, shown in FIG. 12, depicts trays 16 and 34 extended even further in direction 28 such that positioning stop 72 is now fitted in notch 80. This view positions tray 16 similar to that shown in FIG. 1 where tray 16 is shown in proximity of vehicle operator 10. As appreciated in FIG. 12, tray 16 (as well as tray 34) is securely held in this position and cannot move unless or until lift bar 46 is engaged pursuant to the foregoing descriptions.

Figure 13:
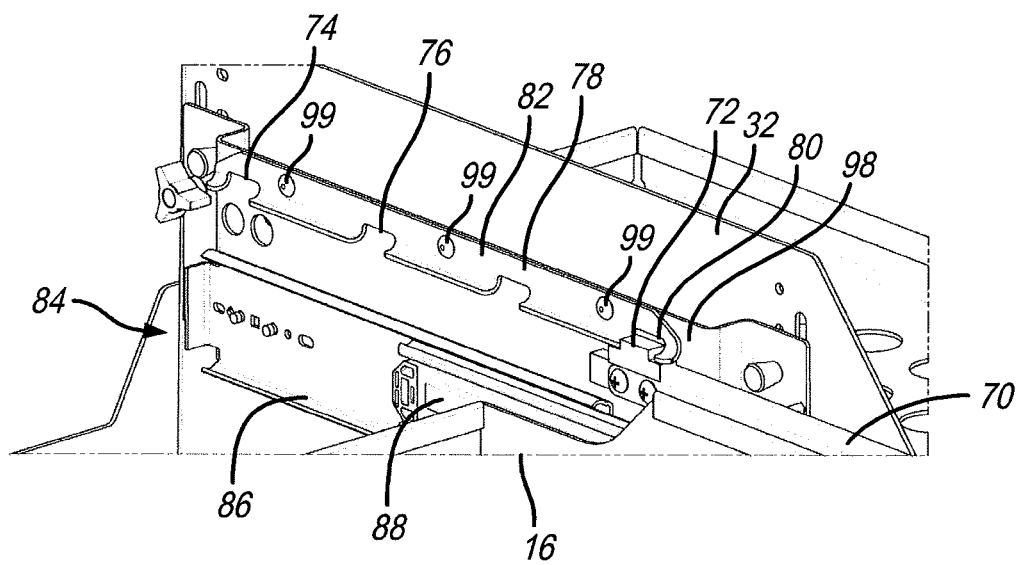
FIG. 13 is a detail perspective view of a portion of the sidewall with a bracket attached thereto.

A detail perspective view of a portion of sidewall 32, with bracket 98 attached thereto, is shown in FIG. 13. This view further depicts positioning stop 72, located in notch 80 of track 82, which is secured to bracket 98 via fasteners 99. This view also illustrates how tray 16, being attached to slide 88, moves with respect to rail bracket 86.

Figure 14:
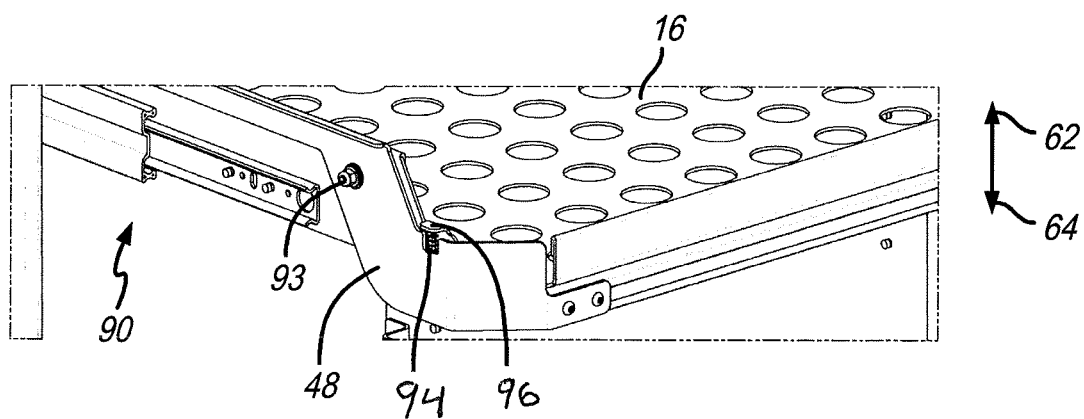
FIG. 14 is a perspective detail view of the tray showing the lift lever in an extended position with respect to the tray rack assembly.

A perspective detail view of tray 16, showing lift lever 48 in an extended position with respect to tray rack assembly 22, is shown in FIG. 14. This view shows tray slide assembly 90, pivot pin 93, spring 94, and tab 96. Here, lift lever 48 pivots on pivot pin 93, just as lift lever 70 pivots on pivot pin 92 as previously discussed. Also, similarly, spring 94 engages tab 96 as well as lift lever 48, to bias lift lever 48 in direction 64, similar to that described with respect to lift lever 70, in FIGS. 8 and 9.

Another illustrative embodiment of the present disclosure provides an adjustable tray height assembly 100 as shown in FIGS. 15, 16, 17, 18, 19A, and 19B. Adjustable tray height assembly 100 allows the tray height with respect to sidewalls 30 and 32 to be conveniently adjusted. In particular, tray 16 may have its height adjusted without having to remove any contents from that tray. Illustratively, brackets, such as brackets 97 and 98, may be located adjacent sidewalls 30 and 32, respectively. Each of these brackets may also include the tracks and tray slide assemblies as discussed previously. It will also be appreciated by the skilled artisan upon reading this disclosure that even though tray height assembly 100 is shown with respect to FIGS. 16, 17, 18, 19A, and 19B, affixed to sidewall 30, all of the corresponding structures and operations previously described apply to sidewall 32 as well.

Figure 15:
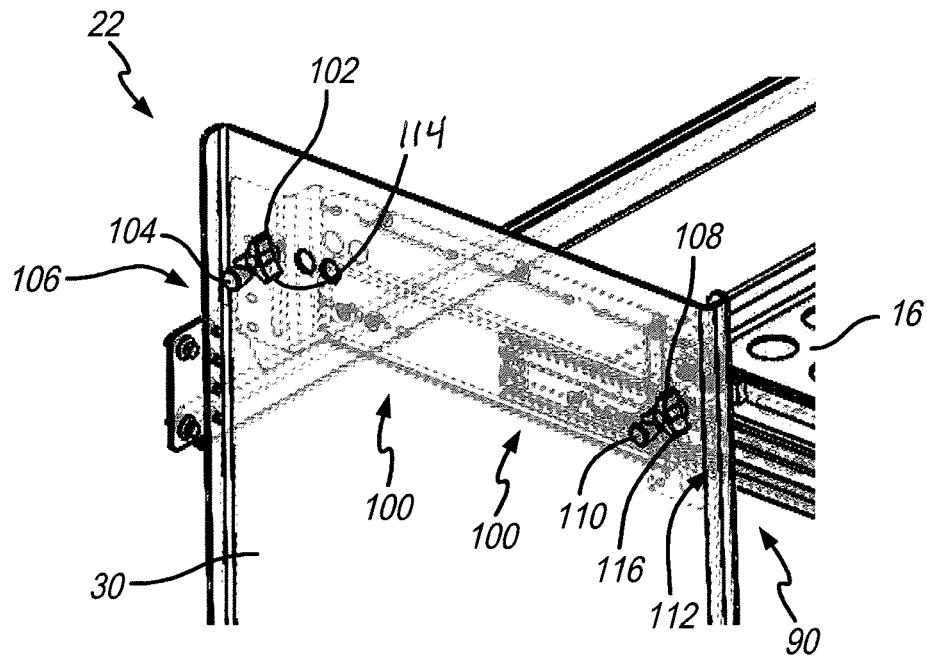
FIG. 15 is a perspective detail view of a portion of the tray rack assembly.

A perspective detail view of a portion of tray rack assembly 22 is shown in FIG. 15. Here, a set knob 102 and spring plunger 104 are shown near rear end 106 of sidewall 30. Similarly, a set knob 108 and spring plunger 110 are shown disposed through sidewall 30 proximal to front end 112 of sidewall 30. As to be further discussed herein, set knobs 102 and 108 are configured to selectively extend and retract from bracket 97 to either secure or release same from sidewall 30. It is appreciated that such spring plungers may be known structures that operate by twisting the set knob a predetermined amount to retract a pin, such as pin 142 (see FIG. 17), from slotted hole 136 (see, also, FIG. 17). Set knobs 102 and 108 include knob portions 114 and 116 that can be rotated to loosen their hold on bracket 97 to allow for adjustment and temporary hold of same against sidewall 30 until spring plungers are set in respective slotted holes. This allows vehicle operator 10 to adjust the height of tray 16 by actuating the spring plunger and loosening the set knob, then adjust the height of the tray by some amount and then reinsert the spring plunger into an aligned slotted hole (such as slotted holes 134, 136, 138, 140 shown in FIG. 17) without having to completely remove the tray or even remove contents from the tray. Loosening and re-tightening the set knobs will hold the tray in position, albeit temporarily, until the spring plungers extend their pins through the designated slotted holes. The set knobs also hold brackets 97 and 98 against their respective sidewalls so the spring plunger pins remain in their designated slotted hole until purposefully removed.

A contemplated method of operation of this includes loosening both set knobs located at the front end of the sidewalls of tray rack assembly 22, adjust tray 16 upward or downward as needed and then reinsert the plunger springs. The same procedure may be performed on the set knob and spring plungers located at rear end 106 of tray rack assembly 22 by the same method.

Figure 16:
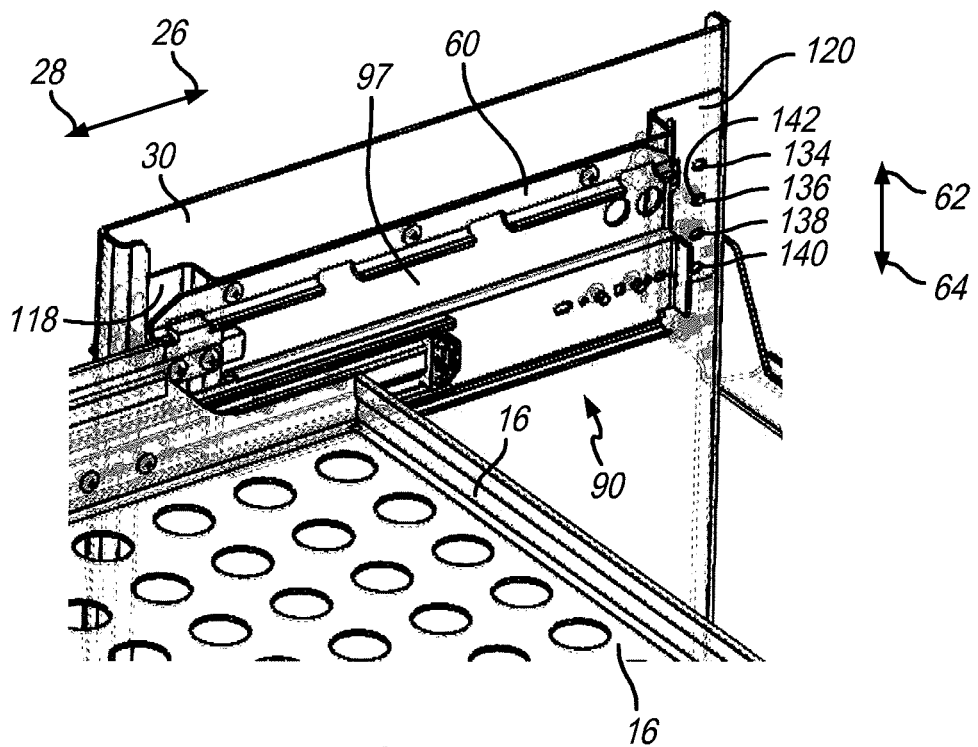
FIG. 16 is another perspective detail view of the tray rack assembly.

A detail perspective view of tray rack assembly 22, showing sidewall 30, is shown in FIG. 16. This is essentially the reverse view of that shown in FIG. 15. Bracket 97 in FIG. 16 is shown affixed to sidewall 30. Tray slide assembly 90, with tray 16 affixed thereon, is shown moved outward in direction 28. Tray slide assembly 90 is also shown illustratively attached to bracket 97 as is track 60. As such, when bracket 97 is moved up or down in direction 62 or 64, so too are tray slide assembly 90 and track 60. It is appreciated that this is also the case with bracket 98, with its tray slotted assembly 90 and track 82. Also shown in this view are bracket flanges 118 and 120 (see, also, FIGS. 19A and 19B). Each of bracket flanges 118 and 120 include adjustment slot 122 and 124, respectively, and a set of slotted holes 126, 128, 130, and 132, as well as 134, 136, 138, and 140, respectively (see, also, FIGS. 19A and 19B). As shown in FIG. 16, pin 142 of spring plunger 104, is illustratively disposed through slotted hole 136. It is appreciated that, and as previously discussed herein, bracket 97 may be adjusted in direction 62 or 64 such that pin 142 maybe disposed through any of slotted holes 134, 136, 138, or 140. The same is the case with the slotted holes 126, 128, 130, 132 disposed through bracket flange 118 with respect to spring plunger 110.

Figure 17:
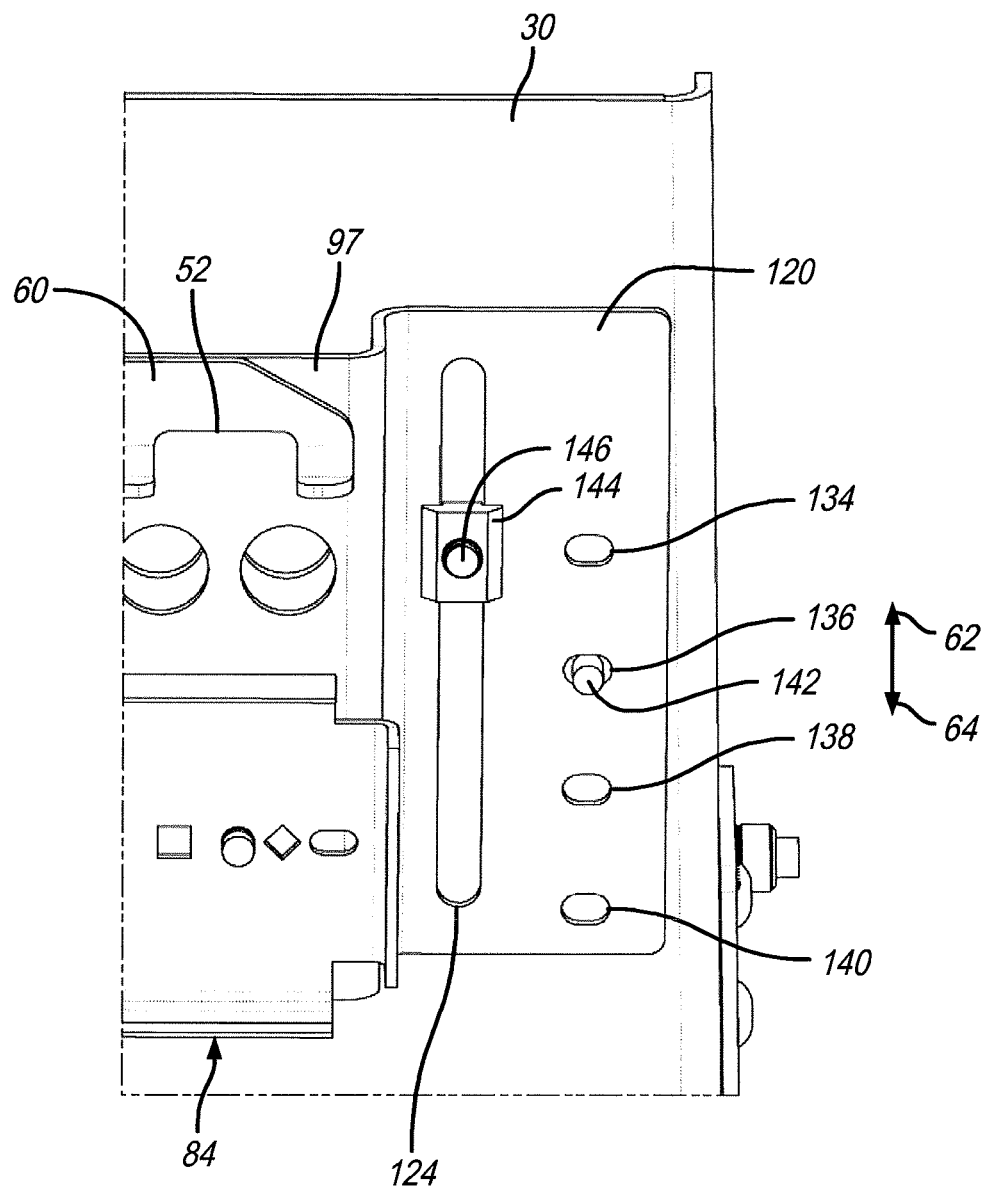
FIG. 17 is a detail perspective view of a bracket flange affixed to the sidewall.

A detail perspective view of bracket flange 120 affixed to sidewall 30 is shown in FIG. 17. Here, pin 142 of spring plunger 104 (see, also, FIG. 18) is shown disposed through slotted hole 136. As appreciated from this view, bracket flange 120 includes slotted holes 134, 136, 138, and 140 which are regularly spaced apart in a vertical orientation. This allows pin 142 to extend through any one of these slotted holes which will hold bracket 97 at one of four predetermined heights with respect to sidewall 30.

Figure 18:
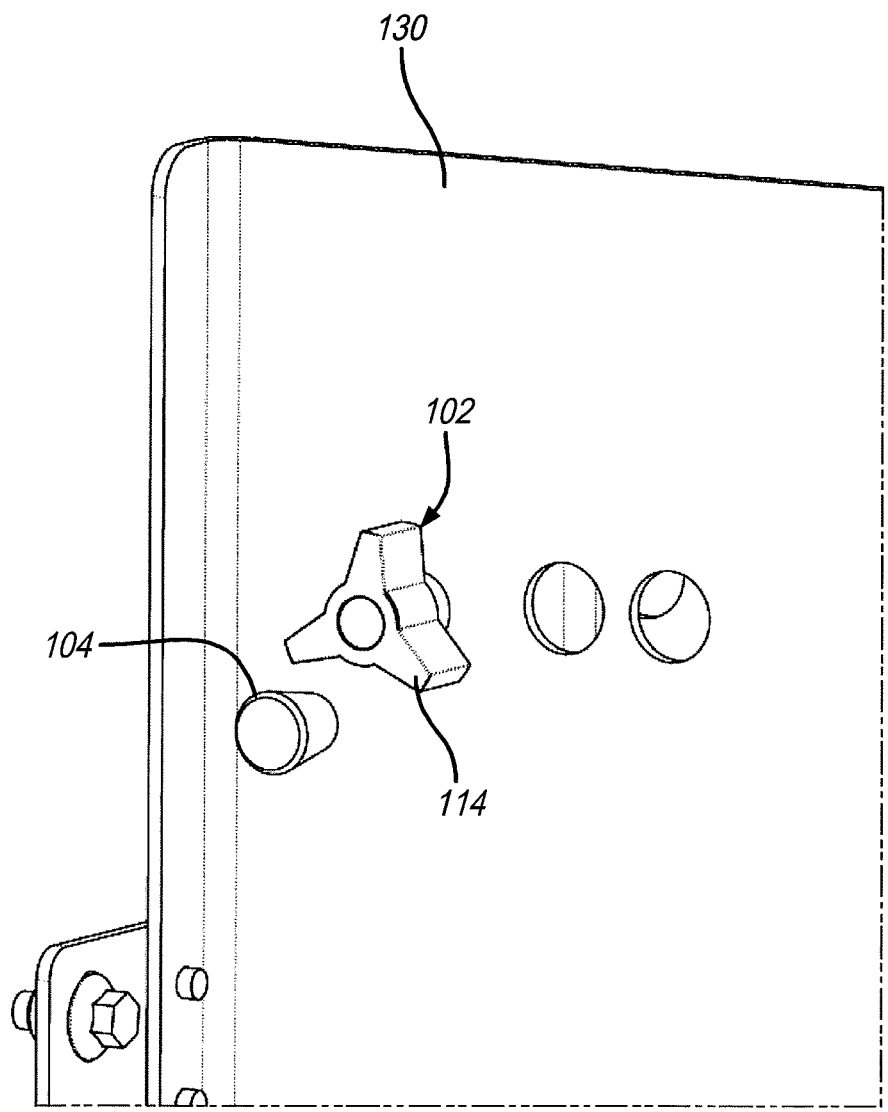
FIG. 18 is a detail perspective view of a spring plunger disposed through the sidewall at a predetermined location.

In the illustrative embodiment, spring plunger 104 is disposed through sidewall 30 at a predetermined location as shown in the perspective detail view of same in FIG. 18. Disposing pin 142 of spring plunger 104 through one of the slotted holes 134 through 140, changes the height of bracket 97 with respect to sidewall 30. It is appreciated that corresponding structures and modes of operation occur the same with respect to bracket 98 affixed to sidewall 32 so that both brackets 97 and 98 may move vertically in either direction 62 or 64 in concert. Also appreciated in FIG. 17 is base 144, which is affixed to fastener 146, and is part of set knob 102 (see, also, FIGS. 15 and 18). By rotating knob portion 114 of set knob 102, fastener 146 is caused to rotate. This, in turn, causes base 144 to either clamp against or release from the periphery of slot 124 of bracket flanges 120. Loosening fastener 146 allows bracket 97 to move vertically in either direction 62 or 64 when pin 142 of spring plunger 104 is not extended through one of slotted holes 134, 136, 138, or 140. Again, this allows for bracket 97 to be temporarily secured onto sidewall 30. Also, because pin 142 of spring plunger 104 is only extended through one of the slotted holes, set knob 102, with base 144, and fastener 146, are configured to hold bracket 97 in place when pin 142 is positioned in one of the slotted holes (see, also, FIG. 19A). In other words, set knob 102 helps secure bracket 97 in place when spring plunger 104 is positioned in one of the slotted holes 134, 136, 138, or 140. These structures and this process is the same for bracket flange 118, as well as the bracket flanges on bracket 98 affixed to sidewall 32.

Figure 19A:
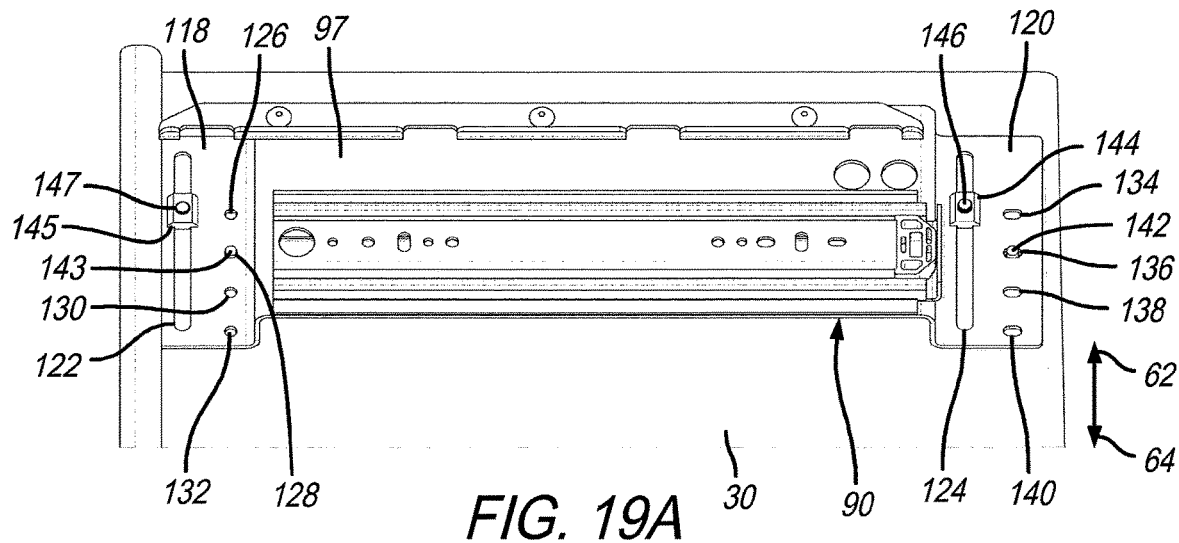
FIG. 19A is a detail side view of a tray height assembly.
Figure 19B:
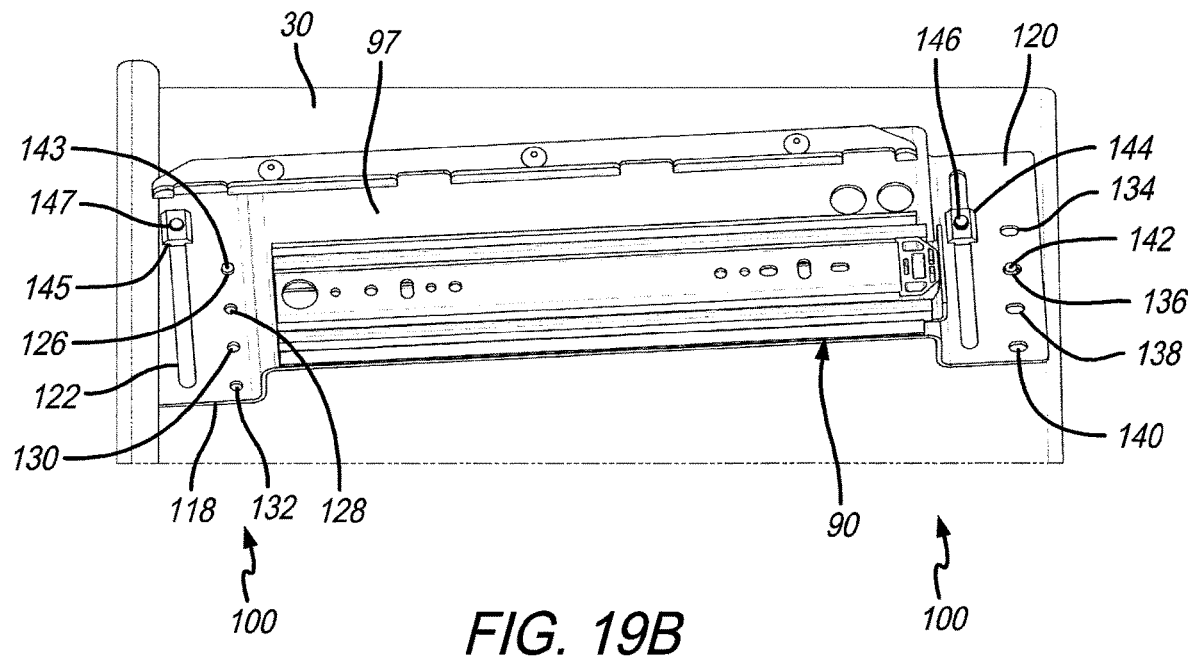
FIG. 19B is another side view of the tray height assembly.

Illustrative operation of tray height assembly 100 is shown in FIGS. 19A and 19B. In this illustrative example, bracket 97 is intended to be lowered from its current position. That current position is where pin 143 of spring plunger 110 is disposed through a second slotted hole 128 from the top of bracket flange 118. Pin 142 of spring plunger 104 is located in slotted hole 136 which is second from the top of bracket flange 120 as well. Bracket 97 will be lowered so that pins 143 and 142 will be located in slotted holes 126 and 134, respectively. To do this, base 145 and fastener 147 of set knob 108 are loosened. If needed, base 144 and fastener 146 of set knob 102, may be loosened as well. Spring plunger 110 may then be activated to retract pin 143 from slotted hole 128. It is noted, however, that at this point, pin 142 of spring plunger 104 does not need to be retracted from slotted hole 136. Instead, and as shown in FIG. 19B, bracket flange 118 is lowered in direction 64 with respect to sidewall 30 and pin 143 extended through slotted hole 126. As shown, base 145 and fastener 147 are moved in adjustment slot 122 towards the top of same. Set knob 108 does not allow bracket 97 to fall. Indeed, set knob 108 may be loosened or tightened as needed to temporarily hold bracket 97 until pin 143 is disposed through slotted 126. It will be appreciated by the skilled artisan upon reading this disclosure that pins 143 and 142 are fitted into slotted holes to allow the progressive adjustment of bracket 97 as particularly shown in FIG. 19B. It is believed that if the hole, such as holes 126 through 132, or 134 through 140, were circular instead of slotted, bracket flange 118 would be unable to lower relative to bracket flange 120, as particularly shown in FIG. 19B. Taking this step-wise approach, vehicle operator 10 may adjust even the front end or back end of bracket 97 (as well as bracket 98) to raise or lower tray 16 without having to disassemble tray rack assembly 22, have to remove articles on the tray, or require help from other persons. Once bracket flange 118 is located at the desired height, then bracket flange 120 moved to the same height, and pins 143 and 142 disposing respective slotted holes, set knobs 108 and 102 may be retightened which will hold bracket 97 onto pins 143 and 142. And, as previously discussed, the same structures and operations may be applied to bracket 98 as well.

Corresponding reference characters indicate corresponding parts throughout the several views. Although the present disclosure has been described with reference to particular means, materials and embodiments, from the foregoing description, one skilled in the art can easily ascertain the essential characteristics of the invention and various changes and modifications may be made to adapt the various uses and characteristics without departing from the spirit and scope of the disclosure.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that any subject matter disclosed in this non-provisional Patent Application that may differ from the priority Application, the disclosure from this non-provisional Patent Application controls.

What is claimed is:

1. A vehicle comprising: a passenger compartment; a cargo compartment located adjacent the passenger compartment; a passageway located between the passenger and cargo compartments; wherein the passageway provides communication between the passenger and cargo compartments; a rack assembly located in the passenger compartment, the rack assembly comprising: a rail; at least one sliding shelf movable along the rail between extended and retracted positions; a track located adjacent the rail; wherein the track includes a plurality of notches; wherein each of the plurality of notches are positioned at periodically spaced apart locations on the track; wherein the at least one sliding shelf is selectively securable at a plurality of intermediate positions between the extended and retracted positions; wherein the periodically spaced apart locations of the plurality of notches along the track are the intermediate positions that the at least one sliding shelf is selectively securable at between the extended and retracted positions; and a lever that is movably coupled to the at least one sliding shelf and movable with the at least one sliding shelf between the extended and retracted positions; wherein the lever includes a stop member that is sized to be received in the each notch of the plurality of notches; wherein when the stop member is received in one notch of the plurality of notches the at least one sliding shelf is secured at one of the plurality of intermediate positions between the extended and retracted positions; and wherein when the lever is moved relative to the at least one sliding shelf the stop member is removed from the one notch of the plurality of notches and the at least one sliding shelf is movable and selectively securable to another of the plurality of intermediate positions between the extended and retracted positions; wherein the at least one shelf is vertical adjustable.

2. The vehicle of claim 1, wherein the plurality of notches include an extended position notch and a retracted position notch.

3. The vehicle of claim 1, wherein the lever is movably coupled to the at least one sliding shelf on a pivot pin so that movement of the lever removes the stop member from the one notch of the plurality of notches.

4. The vehicle of claim 1, wherein the lever is biased toward the track by a bias member such that movement of the at least one sliding shelf to another notch of the plurality of notches causes the stop member to be received in another notch of the plurality of notches.

5. The vehicle of claim 1, wherein the at least one sliding shelf includes a tray.

6. The vehicle of claim 1, wherein the at least one sliding shelf is a plurality of sliding shelves, wherein each shelf of the plurality of sliding shelves is selectively securable at a plurality of intermediate positions between the extended and retracted positions.

7. The vehicle of claim 1, wherein the at least one sliding shelf is vertically adjustable without having to remove any contents from the at least one sliding shelf.

8. The vehicle of claim 1, wherein the at least one sliding shelf includes a vertical height adjustment that includes at least one set fastener and at least one pin which are each engageable with the track, wherein the track is located on a wall of the rack assembly, wherein the track includes a plurality of spaced apart openings sized to receive the at least one pin, wherein the plurality of spaced apart openings are located at discrete vertically-oriented positions with respect to each other along the track, wherein the at least one pin is selectively engageable with each opening of the plurality of spaced apart openings, wherein the track includes a vertically-oriented slot sized to receive the set fastener to selectively position the track at a plurality of locations on the wall.

9. The vehicle of claim 8, wherein when the pin is selectively disengaged from the opening of the plurality of spaced apart openings and the set fastener is loosened from the vertically-oriented slot the track of the at least one sliding shelf is movable to another discrete vertical position with respect to wall, wherein when the track is located at the another discrete vertical position the set fastener is tightened to the vertically-oriented slot and the pin is moved to engage another opening of the plurality of spaced apart openings to secure the track to the another discrete vertical position.

10. A vehicle comprising:
   a rack assembly located in the vehicle, the rack assembly comprising:
      a rail;
      at least one shelf movable along the rail between extended and retracted positions;
      a track located adjacent the rail;
      wherein the track includes a plurality of stop positions;
      wherein each of the plurality of stop positions are positioned at periodically spaced apart locations along the track;
      wherein the at least one shelf is selectively securable at a plurality of intermediate positions between the extended and retracted positions;
      wherein the periodically spaced apart locations of the plurality of stop positions along the track are the intermediate positions that the at least one shelf is selectively securable at;
      wherein the at least one shelf includes a stop member selectively engageable with the each stop position of the plurality of stop positions; and
   wherein when the stop member engages one stop position of the plurality of stop positions the at least one shelf is secured at one intermediate position of the plurality of intermediate positions between the extended and retracted positions; wherein the at least one shelf is vertical adjustable.

11. The vehicle of claim 10, wherein when the stop member of at least one shelf is removed from the stop position the at least one shelf is movable and selectively securable to another of the plurality of intermediate positions between the extended and retracted positions.

12. The vehicle of claim 10, further comprising a passenger compartment, a cargo compartment located adjacent the passenger compartment, and a passageway located between the passenger and cargo compartments, wherein the passageway provides communication between the passenger and cargo compartments, and wherein the rack assembly is located in the passenger compartment.

13. The vehicle of claim 10, wherein the plurality of stop positions are structures selected from the group consisting of at least one of magnetic stop, clamp stop, spring plunger stop, and notch.

14. The vehicle of claim 10, wherein the stop member is a structure selected from the group consisting of at least one of a magnetic stop, clamp stop, spring plunger stop, tab, and block.

15. The vehicle of claim 10, further comprising a lever that is movably coupled to the at least one shelf and movable with the at least one shelf between the extended and retracted positions.

16. The vehicle of claim 15, wherein when the lever is moved relative to the at least one shelf the stop member is removed from the stop position of the plurality of stop positions and the at least one shelf is movable and selectively securable to another of the plurality of stop positions.

17. A vehicle comprising:
a rack assembly located in the vehicle, the rack assembly comprising:
   a rail;
   at least one shelf movable along the rail between extended and retracted positions;
   a track located adjacent the rail;
   wherein the track includes a plurality of stop positions;
   wherein each of the plurality of stop positions are positioned at periodically spaced apart locations along the track;
   wherein the at least one shelf is selectively securable at a plurality of intermediate positions between the extended and retracted positions;
wherein the at least one sliding shelf includes a vertical height adjustment that includes at least one set fastener and at least one pin, each engageable with the track;
   wherein the track is located on a wall of the rack assembly;
   wherein the track includes a plurality of spaced apart openings sized to receive the at least one pin;
   wherein the plurality of spaced apart openings are located at discrete vertical positions with respect to each other along the track;
   wherein the at least one pin is selectively engageable with each opening of the plurality of spaced apart openings; and
wherein the track includes a vertically-oriented slot sized to receive the set fastener to selectively position the track at a plurality of locations on the wall.

18. The vehicle of claim 17, wherein when the pin is selectively disengaged from the opening of the plurality of spaced apart openings and the set fastener is loosened from the vertically-oriented slot, the track of the at least one sliding shelf is movable to another discrete vertical position with respect to wall, wherein when the track is located at the another discrete vertical position, the set fastener is tightened to the vertically-oriented slot of the track, the pin is moved to engage another opening of the plurality of spaced apart openings to secure the track to the another discrete vertical position.

19. The vehicle of claim 17, wherein the periodically spaced apart locations of the plurality of stop positions along the track are in the intermediate positions that the at least one shelf is selectively securable at, and wherein the at least one shelf includes a stop member selectively engageable with the each stop position of the plurality of stop positions, wherein when the stop member engages one stop position of the plurality of stop positions the at least one shelf is secured at one intermediate position of the plurality of intermediate positions between the extended and retracted positions.

\* \* \* \* \*